July 15, 1958  J. W. BACON, JR  2,842,957
NON-DESTRUCTIVE METHOD OF TESTING BONDED CELLULAR PANELS
Filed May 17, 1955

INVENTOR:
John W. Bacon, Jr.
By Hubert E. Metcalf
His Patent Attorneys

United States Patent Office 2,842,957
Patented July 15, 1958

2,842,957
NON-DESTRUCTIVE METHOD OF TESTING BONDED CELLULAR PANELS

John W. Bacon, Jr., Palos Verdes Estates, Calif., assignor to Northrop Aircraft, Inc., Hawthorne, Calif., a corporation of California Application May 17, 1955, Serial No. 509,051

3 Claims. (Cl. 73—37)

This invention has to do with bonded cellular panels and more particularly with a non-destructive method of testing the same.

The fabrication of honeycomb core sandwich panels having a large variety of contours has occupied and is occupying an increasingly important position in certain industries. A cellular or honeycomb core sandwich panel is defined for the purpose of this specification, as a pair of skin or face sheets, usually metal, in contact with the edges of a cellular, usually hexagonal, core, with the skin sheets bonded to the edges of the cell walls, as by thermo-setting plastic adhesives, for example. The core is usually, but not necessarily, formed from corrugated metallic sheets. When the cells in the core are hexagonal, as is customary, the name of honeycomb core is often used.

The use of adhesives for joining the face or skin sheets to the core offers, generally, advantages over other fastening methods. Less weight, the absence of projections, and the distribution of stresses over large areas are some of the advantages.

One of the major disadvantages in the use of adhesives is the difficulty of evaluating the quality of joint or bond. This disadvantage is one factor that deters designers from a more extensive utilization of the adhesive bond. Current practice in the construction of adhesive bonds tends toward extremes in process control and in the destructive testing of selected assemblies.

The principal object of this invention is to provide a method of testing honeycomb core or cellular sandwich panels which does not result in destroying the same.

Another object of this invention is to provide a non-destructive method of testing cellular sandwich panels that may readily be used by all but the least skilled artisan.

Figure 1:
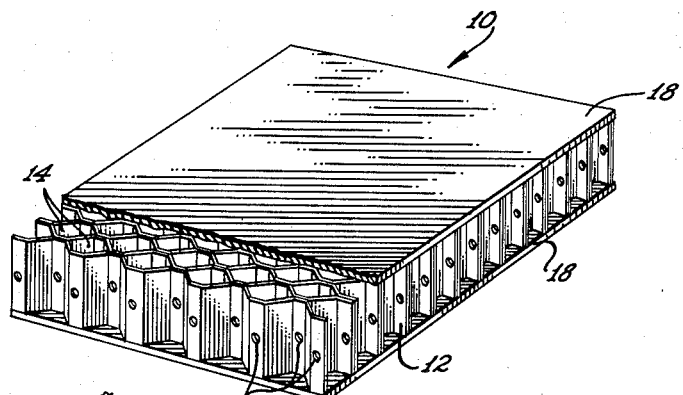
Figure 1 is a fragmentary, perspective view illustrating a typical, honeycomb core sandwich panel.

Reference is made to the drawings for a more detailed description of the invention. A typical, honeycomb core sandwich panel is illustrated in Figure 1 and broadly designated 10. This panel comprises a core 12 having a multiplicity of hexagonal cells 14 as a part thereof. Each of the cells is in communication with each of the other cells through the medium of openings 16 formed in the cell walls. Bonded to the edges of the cell walls of the core 12 are skin or face sheets 18 having a reflective surface. The peripheral edge of the panel 10 is generally exposed, in the manner as illustrated in Figure 1, prior to actual assembly in the structure to be fabricated. The panel 10 is required to withstand certain predetermined test loads or forces that are generally in excess of the actual operating loads. Heretofore it has not been possible to accurately determine whether the panel 10 meets the specifications or not without destructively testing a sample chosen at random or prepared simultaneously with a panel.

Figure 2:
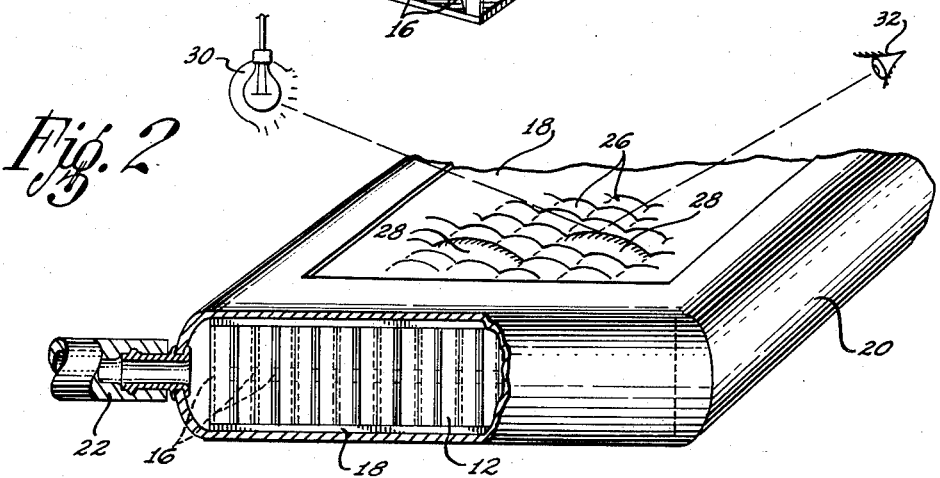
Figure 2 is a fragmentary, perspective view showing one method of non-destructive testing of the adhesive bond as applied to a honeycomb core sandwich panel and illustrating, although greatly exaggerated, blisters that temporarily occur to distort the panel when pressure is applied to the interior.

Attention is directed to Figure 2 wherein one method of non-destructive testing of a panel 10 is illustrated. Completely circumscribing the peripheral edges of the panel 10 applied thereto is a tape 20 having a drying or non-drying adhesive thereon. The tape 20 is applied to the skin or face sheets 18 in the manner illustrated in Figure 2, and renders the interior of the panel 10 air tight. The tape 20 can also have as a property thereof, a limited elasticity or not, depending on the conditions prevailing.

Extending through the tape and rendered secure therein is an air hose 22 that has for its purpose the directing of air into the interior of panel 10. The operation of the form of the invention illustrated in Figure 2 is as follows: Air is directed through the hose 22 into the interior of the panel 10 after the tape 20 has been applied to the latter. The predetermined test pressure is gradually and carefully established in order that the core 12 or fabricated panel 10 will not be inadvertently ruptured while being tested. The air circulates and the test pressure is established throughout the interior of the panel 10 through openings 16 in the core 12. As the pressure increases the force tends to rupture the bond between the skin sheets 18 and the core 12. The skin sheets 18 whether they be metal or some other material have a certain elasticity which is acted upon by the exerted force to cause blisters or raised portions 26 to temporarily appear. In other words the reflective surface of the skin sheet 18 is distorted. However, if the bond between the core 12 and skin sheet 18 is not rigid enough to withstand the testing forces being applied, a break of the bond will occur. Where the break occurs there will appear on the skin sheet 18 an irregular shaped blister or raised portion 28. The distortion of the skin sheets 18 may be made more readily discernible by applying a light source 30 to the panel 10. The viewing of the surface may be done by the artisan or operator assuming the representative position 32. However, a camera or other applicable instrument may be placed in position 32. The same type of irregularity will occur, if there initially was no bond at all.

On completion of the test, the air pressure is reduced, the tape 20, and hose 22 are removed and the panel 10 is ready for assembly. Further, the tape 20, and hose 22 may again be immediately applied to another panel 10 and the test repeated.

The effects of the applied air pressure as exerted is an exercise of the elasticity of the skin sheets 18 resulting in the reflecting surface thereof being distorted into the general geometric pattern illustrated in Figure 2.

Figure 3:
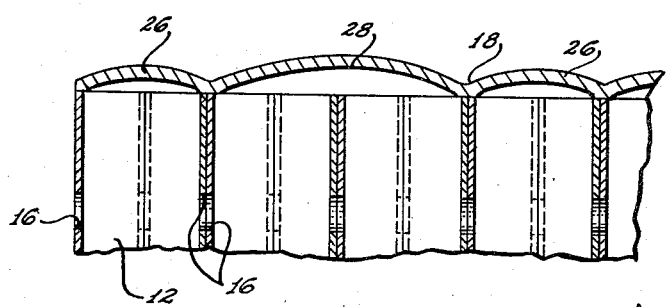
Figure 3 is a fragmentary, side elevation view, of a section of honeycomb core sandwich panel illustrating in an enlarged and exaggerated condition a flaw as it would generally appear in an otherwise well constructed panel.

Again, if there is a flaw in the bond, an irregular shaped and generally larger blister illustrated in Figures 2 and 3 will occur which does not conform to the pattern.

It is to be understood that the form of the invention illustrated may be applied to virtually any panel regardless of the contour and the results would be substantially identical to those described.

Further, in the event the surface of skin sheets 18 is not metallic and/or reflective a suitable material may be applied thereto. Such a material could be sprayed or brushed on and be in the nature of a lacquer, varnish or enamel. Additionally a suitable reflective surface may be prepared by applying a thin flexible mirror to the skin sheets 18. The mirror may have a drying or non-drying adhesive applied to one side in order that a reliable contact could be made to the skin sheets. The mirror may or may not be removed after testing as may be seen desirable.

Additionally, the structure illustrated in Figure 2 may be inserted into a vacuum bag and the latter be evacuated in order to create a differential in pressure between the interior of said panel and exterior.

The essential feature to be remembered in all the modifications suggested as well as the one shown is to have a greater pressure on the interior of said panel than on the exterior. Otherwise many procedures may be used to arrive at the same result.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A non-destructive method of testing panels having a pair of skin sheets bonded to cellular material, the cells of which are in intercommunicating relationship comprising applying a reflective surface on the exterior surface of said panel; applying a removable tape about the peripheral edges of said panel to render the interior substantially air tight; and creating air pressure differential between the interior and exterior of said panel by an air hose inserted through an opening in said tape to cause structural weaknesses in the panel to reflectively distort said reflective surface.

2. A non-destructive method of testing panels having a pair of reflective skin sheets bonded to cellular material, the cells of which are in intercommunicating relationship comprising applying a removable tape about the peripheral edges of said panels to render the interior of said panels air tight; and creating a pressure differential between the interior and exterior of said panels with the greater pressure being on the interior, to cause structural weaknesses to distort said reflective skin sheets.

3. A non-destructive method of testing panels having a pair of skin sheets bonded to cellular material, the cells of which are in intercommunicating relationship comprising applying a mirror surface on the exterior surfaces of said skin sheets; applying a removable tape about the peripheral edges of said panels to render the interior of said panels air tight; and creating a pressure differential between the interior and exterior of said panels with the greater pressure being on the interior, to cause structural weaknesses to distort said mirror surface.

References Cited in the file of this patent

UNITED STATES PATENTS

| | | |
|---|---|---|
| 2,041,450 | Adams | May 19, 1936 |
| 2,222,079 | Larson | Nov. 19, 1940 |
| 2,453,338 | Pajak | Nov. 9, 1948 |
| 2,573,366 | Scholl | Oct. 30, 1951 |
| 2,609,068 | Pajak | Sept. 2, 1952 |
| 2,646,716 | Bowen | July 28, 1953 |
| 2,660,053 | Buehner | Nov. 24, 1953 |